United States Patent [19]

Grimes

[11] Patent Number: 5,604,790
[45] Date of Patent: Feb. 18, 1997

[54] VOICE PROCESSING CALL ANNOUNCEMENT AND ANSWERING SYSTEM

[75] Inventor: Gary J. Grimes, Birmingham, Ala.

[73] Assignee: Lucent Technologies Inc., Murray Hill, N.J.

[21] Appl. No.: 298,901

[22] Filed: Aug. 31, 1994

[51] Int. Cl.$^6$ .................................................. H04M 1/66
[52] U.S. Cl. .............................................. 379/67; 379/142
[58] Field of Search .................................. 379/67, 88, 89, 379/142, 127, 245, 246, 249

[56] References Cited

U.S. PATENT DOCUMENTS

| | | | |
|---|---|---|---|
| 4,481,384 | 11/1984 | Matthews . | |
| 4,672,660 | 6/1987 | Curtin | 379/88 |
| 4,850,005 | 7/1989 | Hashimoto | 379/88 |
| 4,899,358 | 2/1990 | Blakely | 379/67 |
| 5,007,076 | 4/1991 | Blakely | 379/67 |
| 5,050,208 | 8/1991 | Jolissaint | 379/209 |
| 5,165,095 | 11/1992 | Borcherding | 379/88 |
| 5,265,145 | 11/1993 | Lim | 379/88 |
| 5,289,530 | 2/1994 | Reese | 379/88 |
| 5,347,574 | 9/1994 | Morganstein | 379/210 |

FOREIGN PATENT DOCUMENTS

| | | | |
|---|---|---|---|
| 6165651 | 4/1986 | Japan | 379/282 |
| 2260670 | 4/1993 | United Kingdom | 379/88 |

*Primary Examiner*—Krista M. Zele
*Assistant Examiner*—Thomas F. Presson
*Attorney, Agent, or Firm*—John C. Moran

[57] ABSTRACT

A telephone terminal that allows simple word commands to produce different results depending on the identity of the caller. The use of a limited set of word commands allows the utilization of an inexpensive voice recognition subsystem. A first single word command results in a caller from a first group of people being immediately placed on a speakerphone; whereas, a caller from a second group of people receives the audio message "Please stay on the line a few seconds, and I will personally answer your call". Further, for the same audio command, the called party can pre-record an audio message for the first group; whereas the second group always receives a voice synthesized message. A second single word command results in a caller from the first group of people receiving an audio message that states "The name of the caller, I will call you in five minutes". Whereas, a caller from the second group of people receives the audio message "Please call back in five minutes".

20 Claims, 3 Drawing Sheets

VOICE PROCESSING CALL ANNOUNCEMENT AND ANSWERING SYSTEM

TECHNICAL FIELD

This invention relates to telecommunication terminals, and more particularly, to a terminal that is responsive to voice commands and caller identification information to perform call processing operations.

BACKGROUND OF THE INVENTION

The transmission of caller identification (hereafter called caller ID) is disclosed in U.S. Pat. No. 4,582,956 of C. A. Doughty. Initially, the caller ID information was simply displayed on an alphanumeric display which was often a separate unit from the telephone. U.S. Pat. No. 5,265,145 of B. C. Lim discloses a telephone that is responsive to the caller ID information to either spell, speak, or display the name of the caller. Voice synthesis is utilized to convert the digital data representing the name of the caller into the audio output. U.S. Pat. No. 5,265,145 clearly allows greater utilization of the caller ID information since it is no longer necessary for the called party to have to be physically close enough to read an alphanumeric display to know the identity of the caller. However, to answer the telephone call in U.S. Pat. No. 5,265,145, it is necessary for the called party to physically pick up the telephone handset in order to talk to the calling party. U.S. Pat. Nos. 4,899,358 and 5,007,076 of J. R. Blakely also disclose the conversion of the digital data representing the caller ID into an audio representation of the name of the caller.

U.S. Pat. No. 5,165,095 of M. A. Borcherding discloses a telephone that is responsive to voice commands to initiate dialing and to determine the correct telephone number to be dialed. This patent illustrates the problems associated with a telephone recognizing voice commands. Namely, the cost of doing voice recognition. As pointed out in this patent, two approaches to speech recognition have evolved: speaker dependent and speaker independent. U.S. Pat. No. 5,165,095 utilizes both approaches in order to reduce costs and increase reliability. The speaker independent approach is utilized to recognize the initial commands to start dialing and then the spoken name or telephone is recognized by using the speaker dependent approach. As U.S. Pat. No. 5,165,095 points out, the speaker dependent approach suffers from high costs and the problems associated in training the voice recognition unit. U.S. Pat. No. 5,165,095 does allow the recognition of voice commands; however, it is an expensive and difficult system to utilize.

The prior art does allow limited hands-free operations of a telephone both in recognizing a caller and for placing a call. What is needed is greater flexibility in using voice commands to answer calls yet use simple, inexpensive, voice recognition techniques while still allowing the capability to respond to different callers in different ways.

SUMMARY OF THE INVENTION

The foregoing problems are solved and the technical art is advanced by an apparatus and method that allow simple word commands to produce different results depending on the identity of the caller. The use of a limited set of word commands allows the utilization of an inexpensive voice recognition subsystem.

Advantageously, a first single word command results in a caller from a first group of people being immediately placed on a speakerphone; whereas, a caller from a second group of people receives the audio message "Please stay on the line a few seconds, and I will personally answer your call". Further, for the same audio command, the called party can pre-record an audio message for the first group; whereas the second group receives a voice synthesized message.

Illustratively, a second single word command results in a caller (Joe, for example) from a first group of people receiving an audio message that states "Joe, I will call you in five minutes". Whereas, a caller from the second group of people receives the audio message "Please call back in five minutes".

DETAILED DESCRIPTION

Figure 1:
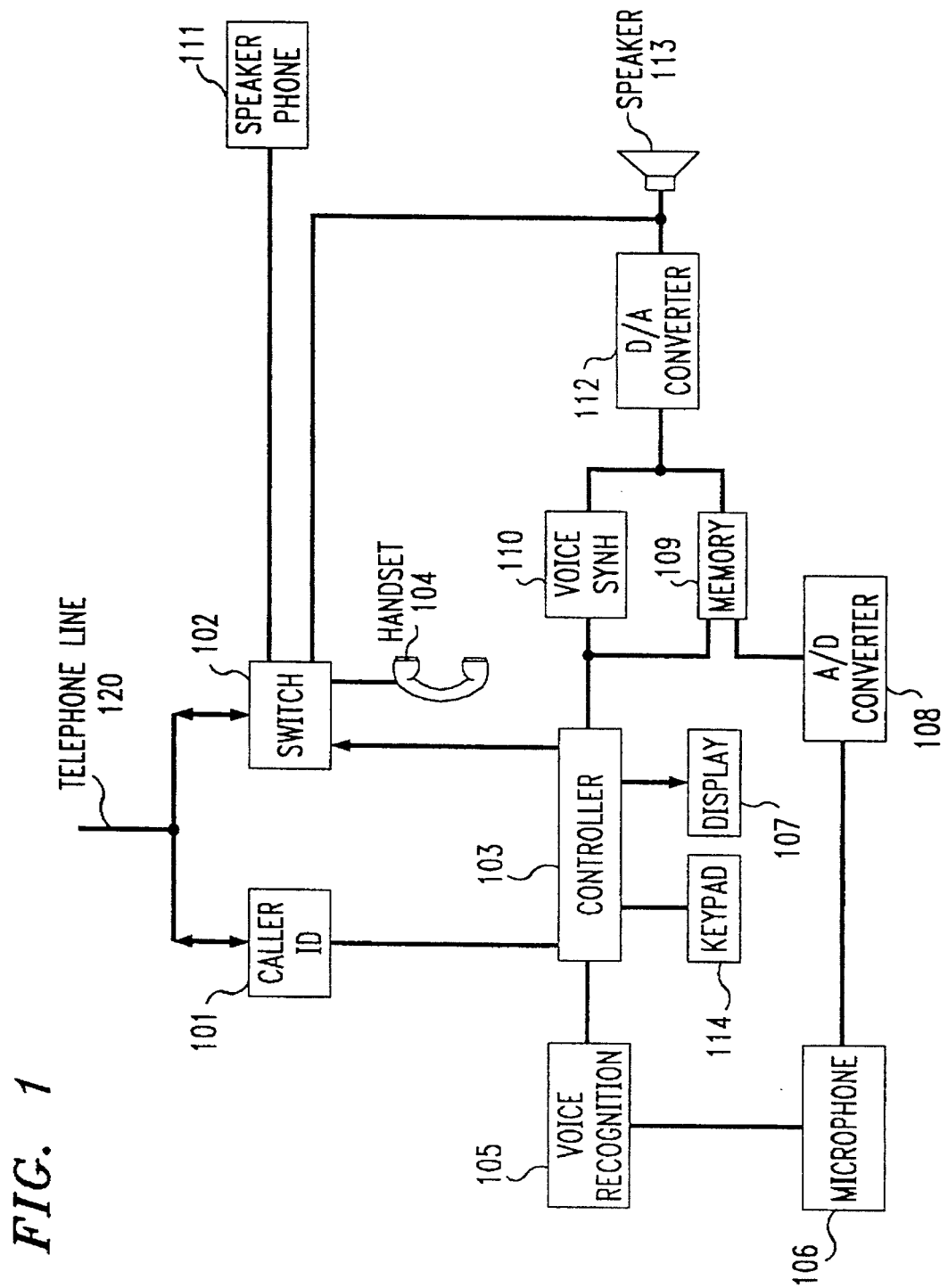
FIG. 1 illustrates, in block diagram form, a telecommunication terminal in accordance with the invention.

Controller 103 is responsive to the caller identification information from an incoming call that is decoded by caller ID 101 and the voice command as recognized by voice recognition 105 via audio input from the called party using microphone 106 to determine the operations that should be performed with respect to the incoming call. Controller 103 groups callers into three groups. Group one are people which the user of the telecommunication terminal considers as friends or close associates and wishes to treat these people in a friendly manner. Group two are individuals who the called party may or may not know. Group three are individuals or organizations with which the called party does not care to have contact. Calls from individuals in group one are announced to the user by controller 103 using either voice synthesizer 110 or memory 109 via speaker 113 and digital-to-analog converter (D/A) 112. With respect to group one individuals, controller 103 first checks to see if an audio representation of the name of that individual is recorded in memory 109 in digital form. If there is an audio representation in digital form, that representation is used by D/A converter 112. If the audio representation for the individual is not in memory 109, controller 103 utilizes voice synthesizer 110. The second group of people are always announced utilizing voice synthesizer 110. A caller from group three is not announced utilizing a voice announcement; rather, the name and number are simply displayed utilizing display 107.

Controller 103 is responsive to the identity of the caller and the voice command received via voice recognizer 105 and microphone 106 to make a further determination of how to handle the incoming call. Voice recognizer 105 is a simple and inexpensive speaker independent recognizer. Although voice recognizer 105 is illustrated as a separate subunit in FIG. 1, the functions of voice recognizer 105 could be performed by controller 103. The commands recognized by voice recognizer 105 are the numbers "1" through "9". If an incoming call is from a caller in groups one or two, controller 103 performs the following actions upon receiving the number "1" from voice recognizer 105. Controller 103 wishes to give preferred treatment to the individuals in group one and also is prepared to allow these people more contact with the called party. Hence, in response to command "1", controller 103 activates switch 102 to put a caller from group one on speakerphone 111 so that the caller and called party can immediately converse. However, a caller from group two receives an audio message that states "I will pick up in a few seconds". Controller 103 then switches the incoming call via switch 102 to handset 104.

Command "5" illustrates a different type of operation with respect to a caller from group one or group two. In response to the voice command "5", controller 103 sends an audio message to a caller from group two that says "please call back in 5 minutes". However, a caller from group one such as the called party's mother receives the following message in response to command "5": "Mom, I will call you in 5 minutes". The voice command "3" is similar to voice command "5" except that the time interval stated is 30 minutes rather than 5 minutes.

Figure 2:
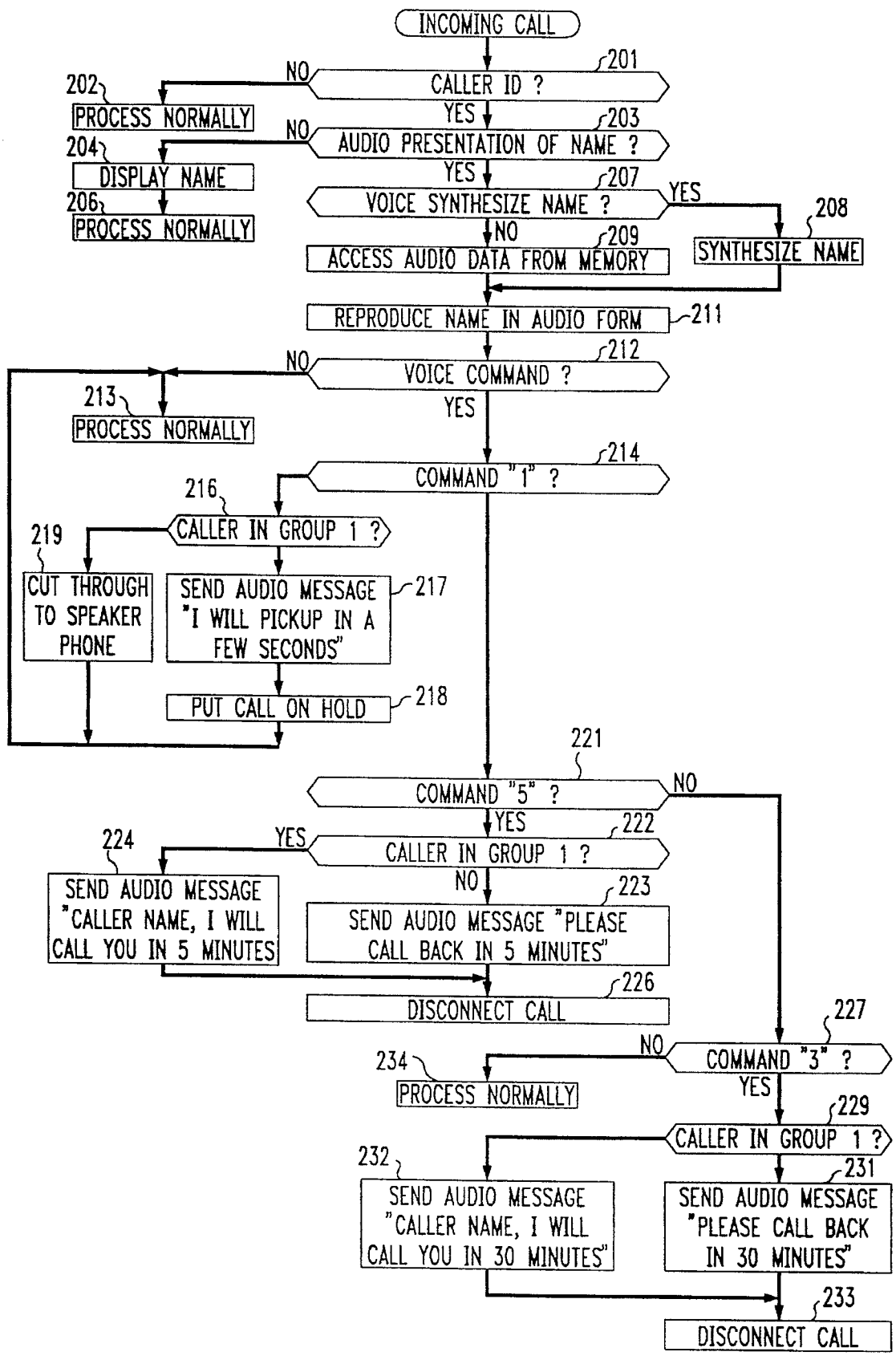
FIG. 2 illustrates, in flow chart form, the operations performed by the controller of FIG. 1 in responding to an incoming call.

FIG. 2 illustrates the operations performed by controller 103. In response to an incoming call, decision block 201 checks to see if caller identification was received by caller ID block 101. If no caller identification data was received, control is transferred to block 202 which processes the call in a normal way which is to switch the call via switch 102 to handset 104. The called party then can answer the incoming call using either handset 104 or speakerphone 111. If caller identification information is received by caller ID block 101, decision block 203 checks memory 109 to see if the caller belongs to group three. If the caller does belong to group three, control is transferred to block 204 which displays the name of the caller on display 107, and then, block 206 processes the call in a normal manner.

Returning to decision block 203, if the answer is yes, control is transferred to decision block 207. Decision block 207 determines whether the caller is in group one or two. If the caller is in group two, control is transferred to block 208 which causes voice synthesizer 110 to synthesize the name in voice form. If the caller is in group one, control is transferred to block 209 which accesses memory 109 for the digital information. Both blocks 208 and 209 transfer control to block 211 which causes D/A converter 112 to reproduce the information generated by voice synthesizer 110 or memory 109. Control is then transferred to decision block 212.

Decision block 212 interrogates voice recognizer 105 to determine whether the called party has issued a voice command. If the called party has not issued a voice command after some predetermined amount of time, control is transferred to block 213 which processes the call in a normal manner. If the called party has issued a voice command, the operations performed by controller 103 are determined by the execution of selected blocks from blocks 214 through 234. Decision block 221 first checks to see if the voice command "5" was issued by the called party. If this command was issued, decision block 222 determines whether the caller was in group one. If the answer is yes, then block 224 is executed which first extracts the name of the caller from memory 109, reproduces this using D/A converter 112, and switches this onto telephone line 120 to the caller via switch 102. Then, controller 103 causes voice synthesizer 110 to reproduce the following words "I will call you in 5 minutes". The output of voice synthesizer 110 is converted to audio form by D/A converter 112 and transmitted to the caller via telephone line 120 and switch 102. Returning to decision block 222, if the answer is no, which means that the caller is group two, then controller 103 utilizes voice synthesizer 110 to transmit the message "Please call back in 5 minutes" to the caller. After execution of either blocks 223 or 224, block 226 is executed which causes the incoming call to be disconnected by switch 102.

Returning to decision block 221, if the answer is no, blocks 227 through 234 are selectively executed and result in operations similar to the operations of blocks 222 through 224. Note, if the result of decision block 227 is no, the call is processed in a normal manner by block 234.

Figure 3:
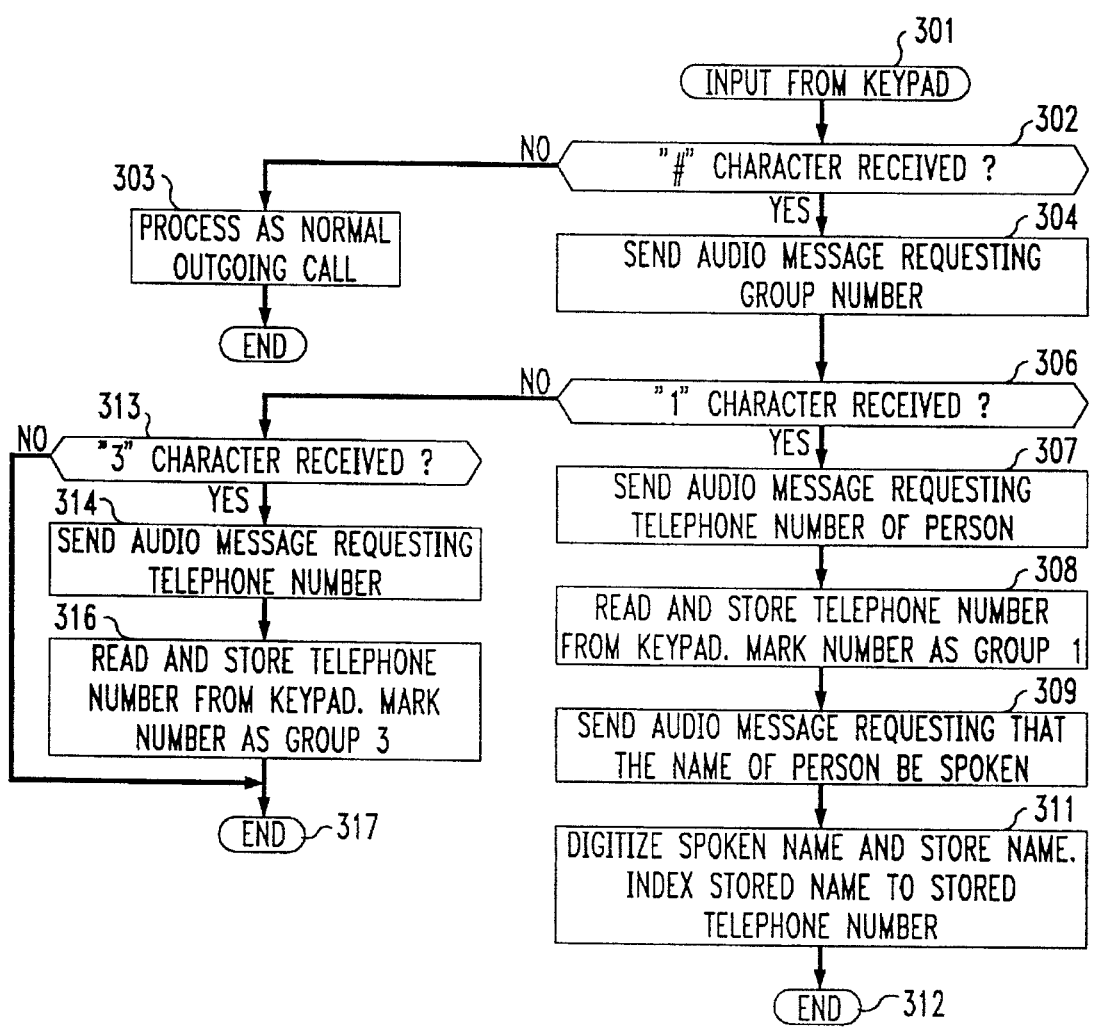
FIG. 3 illustrates, in flow chart form, the operations performed by the controller of FIG. 1 in receiving and storing group information.

FIG. 3 illustrates the operations performed by controller 103 in storing information concerning the first and third groups of callers. It is not necessary to store information concerning the second group of callers. Block 301 detects when a key has been actuated on keypad 114 of FIG. 1. When a key has been actuated, control is transferred to decision block 302. The latter decision block interrogates the character to determine if it is the "#". If it is not this character, control is transferred to block 303 where the input from keypad 114 is processed as the dialing of a normal outgoing call. If the answer to decision block 302 is yes, control is transferred to block 304 which sends an audio message requesting the group number for which information is going to be entered.

Decision block 306 determines whether a "1" has been actuated on keypad 114 which would indicate the administration of group 1 numbers. If a "1" character was received, control is transferred to block 307 which sends an audio message requesting the telephone number of the person that is being entered into group 1. This audio message is synthesized by voice synthesizer 110 and is played on speaker 113 via D/A converter 112. Block 308 then reads and stores the telephone number as it is entered on keypad 114. This number is marked as being part of group 1. Controller 103 then executes block 309 and requests via voice synthesizer 110, D/A converter 112, and speaker 113 that the name of the person be spoken. A/D converter 108 is responsive to the speaking of the person's name into microphone 106 to digitize the spoken name and store the result in memory 109 under control of controller 103. Controller 103 then indexes the stored digitized name by execution of block 311. The functions associated with group 1 are now completed and the procedure comes to an end by execution of block 312.

Returning to decision block 306, if the answer in this decision block was no, control is transferred to decision block 313 which determines if the "3" character was received from keypad 114. If a "3" was received, an audio message is transmitted to speaker 113 requesting a telephone number by execution of block 314. Block 316 then reads and stores the telephone number as it is entered from the keypad and marks this number as being part of group 3. The procedure is then ended by execution of block 317.

It is to be understood that the above-described embodiments are merely illustrative of the principles of the invention and that other arrangements may be devised by those skilled in the art without departing from the spirit or scope of the invention.

I claim:

1. A method of controlling incoming calls received by a telephone terminal comprising the steps of:

receiving caller identification information with an incoming call received by the telephone terminal;

determining from the caller identification information whether the caller is of a first group or second group of callers by the telephone terminal;

announcing a name of the caller;

recognizing first command information received by the telephone terminal from first audio information spoken by a user of the telephone terminal;

performing a first operation by the telephone terminal in response to the first command information when the caller is of the first group; and performing a second operation by the telephone terminal in response to the first command information when the caller is of the second group.

2. The method of claim 1 wherein the step of determining further determines whether the caller is of a third group;

the step of performing further performs a third operation by the telephone terminal in response to the first command information when the caller is of the third group.

3. The method of claim 2 wherein the step of announcing comprises the step of using prerecorded human speech to announce the name of the caller when the caller is of the first group and synthesized speech when the caller is of the second group.

4. The method of claim 2 further comprises the step of displaying the name of the caller as alphanumeric information when the caller is of the third group.

5. The method of claim 2 wherein the first audio information is a single word.

6. The method of claim 2 wherein the first operation is to place the caller on a speakerphone.

7. The method of claim 6 wherein the second operation is to transmit to the caller an audio message stating that the user of the telephone terminal will answer the call in a first predefined time period.

8. The method of claim 2 wherein the step of recognizing further recognizes second command information from second audio information spoken by a user of the telephone terminal;

the step of performing further performs a fourth operation in response to the second command information when the caller is of the first group; and the step of performing further performs a fifth operation in response to the second command information when the caller is of the second group.

9. The method of claim 8 wherein the fourth operation is to transmit to the caller an audio message stating the name of the caller and that the user will call the caller back in a second predefined period of time.

10. The method of claim 8 wherein the fifth operation is to transmit to the caller an audio message stating that the caller is to call back in a second predefined period of time.

11. A telephone terminal for controlling incoming calls comprising:

means for receiving caller identification information with an incoming call;

means for determining from the caller identification information whether the caller is of a first group or second group of callers;

means for announcing a name of the caller;

means for recognizing first command information received by the telephone terminal from first audio information spoken by a user of the telephone terminal;

means for performing a first operation in response to the first command information when the caller is of the first group; and means for performing a second operation in response to the first command information when the caller is of the second group.

12. The telephone terminal of claim 11 wherein the means for determining further determines whether the caller is of a third group;

the means for performing further performs a third operation in response to the first command information when the caller is of the third group.

13. The telephone terminal of claim 12 wherein the means for announcing comprises means for using prerecorded human speech to announce the name of the caller when the caller is of the first group and synthesized speech when the caller is of the second group.

14. The telephone terminal of claim 12 further comprises means for displaying the name of the caller as alphanumeric information when the caller is of the third group.

15. The telephone terminal of claim 12 wherein the first audio information is a single word.

16. The telephone terminal of claim 12 wherein the first operation is to place the caller on a speakerphone.

17. The telephone terminal of claim 16 wherein the second operation is to transmit to the caller an audio message stating that the user of the telephone terminal will answer the call in a first predefined time period.

18. The telephone terminal of claim 12 wherein the means for recognizing further recognizes second command information from second audio information spoken by a user of the telephone terminal;

the means for performing further performs a fourth operation in response to the second command information when the caller is of the first group; and the means for performing further performs a fifth operation in response to the second command information when the caller is of the second group.

19. The telephone terminal of claim 18 wherein the fourth operation is to transmit to the caller an audio message stating the name of the caller and that the user will call the caller back in a second predefined period of time.

20. The telephone terminal of claim 18 wherein the fifth operation is to transmit to the caller an audio message stating that the caller is to call back in a second predefined period of time.

* * * * *